United States Patent Office 2,973,360
Patented Feb. 28, 1961

2,973,360
CERTAIN 1-(2-THEONYL LOWER ALKYL)-4-(HETEROCYCLIC SUBSTITUTED) - PIPER-AZINES

Paul A. J. Janssen, Antwerpse Steenweg 16', Vosselaar, near Turnhout, Belgium
No Drawing. Filed Oct. 12, 1959, Ser. No. 845,627
5 Claims. (Cl. 260—256.5)

The present invention relates to a new group of thienylalkylpiperazine derivatives and more particularly to 1-(2-thienyl)-ω-piperazinealkanols substituted in the 4-position by a nitrogen-containing heterocyclic group. The compounds of this invention can be represented as the bases of the general structural formula

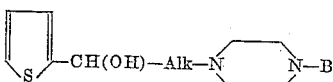

and the pharmaceutically acceptable non-toxic salts thereof, wherein B is a member of the class consisting of pyridyls, methylpyridyls, and pyrimidyl radicals; and Alk is a lower alkylene radical. The radical Alk is a lower alkylene radical such as methylene, ethylene, propylene, butylene, trimethylene, tetramethylene, pentamethylene, and hexamethylene. Radicals of 3–4 carbon atoms are preferred. The halogen can represent fluorine, chlorine, and iodine.

The compounds of this invention can be advantageously prepared by the reduction of a ketone of the structural formula

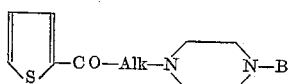

wherein B and Alk are defined as above, with a metal hydride of the type (Alkali metal)NH$_4$ in which Z is an element of periodic Group III of an atomic number less than 14.

Another useful procedure for the preparation of these compounds employs the alkaline hydrolysis of (for example, with sodium hydroxide) a halogen compound of the structural formula

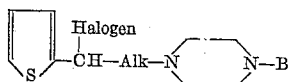

wherein Alk and B are defined as above. The hydrohalide salt of this halogen compound is formed by the addition of 2 molecular equivalents of a hydrogen halide to the corresponding thenylidene compound in acetic acid.

The compounds can also be prepared by the condensation of a compound of the type

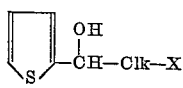

with a compound of the type

In this reaction B and Alk are defined as above and X as a readily replaceable electro-negative group, e.g., halogen, an arylsulfonoxy group or an alkylsulfonoxy group.

The compounds of this invention are depressants of the central nervous system. More particularly, they are analgesics and barbiturate potentiators.

The organic bases of this invention form pharmaceutically useful non-toxic salts with a variety of inorganic and strong organic acids including sulfuric, phosphoric, hydrochloric, hydrobromic, hydriodic, sulfuric, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds which constitute this invention and the methods for their preparation will appear more fully from a consideration of the following examples which are given for the purpose of illustration only and are not to be construed as limiting the invention in spirit or in scope. In these examples quantities are indicated as parts by weight, temperatures are expressed in degrees centigrade (° C.), and pressures are expressed in millimeters of mercury (mm.).

Example 1

A mixture of 86.4 parts of 2-bromo-4-methylpyridine, 85 parts of anhydrous piperazine, 53 parts of sodium carbonate, and 120 parts of pentanol is stirred and refluxed for five hours with continual removal of the water formed. The mixture is filtered and the filtercake washed with butanol. The combined filtrate and washings are concentrated under reduced pressure. The oily residue, 1-(4-methyl-2-pyridyl)piperazine, is distilled and the fraction boiling at 161–163° C. at a pressure of 8 mm. is collected. An equimolar substitution of 2-bromopyridine for 2-bromo-4-methylpyridine yields 1-(2-pyridyl)piperazine.

A mixture of 5.2 parts of 2-(β-chloropropionyl)thiophene and 10 parts of 1-(2-pyridyl)piperazine is allowed to stand at room temperature for 36 hours. The mixture is then boiled with 600 parts of dry ether and the precipitate removed by filtration. The filtrate is evaporated until crystallization begins and the mixture is cooled to 0° C. After filtration and recrystallization from ether, 1-[β-(2-thenoyl)ethyl] - 4 - (2-pyridyl)piperazine which melts at about 80–81° C. is obtained.

To a solution of 3.5 parts of 1-[β-(2-thenoyl)ethyl]-4-(2-pyridyl)piperazine in 110 parts of absolute ethanol is added 0.03 part of sodium borohydride portionwise and the stirring is continued for 2 hours. After concentrating under vacuum to a total volume of about 50 parts, 100 parts of 2-N hydrochloric acid and 800 parts of water are added to the mixture. The solution is made alkaline with sodium hydroxide. After cooling at 0° C., the precipitate formed is filtered and recrystallized from diisopropyl ether to yield the white flaky powder of 1-(2-thienyl)-3-[4-(2-pyridyl)piperazine]-1-propanol melting at about 97.5–98.5° C. The compound has the formula

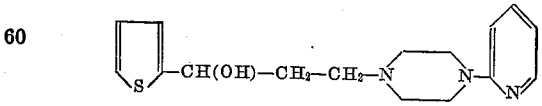

Example 2

A mixture of 84 parts of anhydrous thiophene, 141 parts of γ-chlorobutyryl chloride and 870 parts of anhydrous benzene is cooled to 0 to —5° C. While this temperature is maintained, 260 parts of stannic chloride are added slowly over a 2 hour period. After the addition is complete, the cooling bath is removed and the stirring is continued for about an hour. The reaction mixture is then poured into a mixture of 60 parts of concentrated hydrochloric acid and 450 parts of ice water.

The organic layer is separated, washed with water, dried over anhydrous calcium chloride and filtered. The filtrate is concentrated under reduced pressure and the residue is distilled to yield 2-(γ-chlorobutyryl)thiophene which boils at 144–146° C. at 11 mm. of pressure.

A mixture of 5.65 parts of 2-(γ-chlorobutyryl)-thiophene and 10 parts of 1-(2-pyridyl)piperazine is heated for 50 hours on an oil bath at 115° C. The mixture is then treated with 100 parts of water and 50 parts of ether. The water layer is extracted again with ether. Diisopropyl ether is added to the combined ether layers and the mixture is dried over magnesium sulfate. After evaporation and drying, the pale-brown powder of 1-[γ-(2-thenoyl)propyl]-4-(2-pyridyl)piperazine, melting at about 70–71° C. is obtained.

To a solution of 3.5 parts of 1-[γ-(2-thenoyl)propyl]-4-(2-pyridyl)piperazine in 160 parts of absolute ethanol, is added 0.03 part of sodium borohydride portionwise with stirring. The stirring is continued 150 minutes after which the mixture is decomposed with 160 parts of 2-N hydrochloric acid, diluted with 1500 parts of water and made alkaline. After cooling for 4 hours at 0° C., a precipitate forms which is filtered and recrystallized from diisopropyl ether by cooling at −20° C. to yield the white crystalline powder of 1-(2-thienyl)-4-[4-(2-pyridyl)-piperazine]-1-butanol melting at about 95–97° C.

*Example 3*

A mixture of 7 parts of 2-(β-chloropropionyl)-thiophene and 14 parts of 1-(4-methyl-2-pyridyl)piperazine is allowed to stand at room temperature for 8 hours. The solid mixture is refluxed with 320 parts of ether for 2 hours and filtered. The mixture is then washed with 300 parts of water, dried over potassium carbonate, and evaporated under vacuum. The residue is boiled in 80 parts of diisopropyl ether and cooled to −20° C. for 5 hours. The precipitate is collected and dried to yield the white powder of 1-[β-(2-thenoyl)ethyl]-4-(4-methyl-2-pyridyl)piperazine which melts at about 92.4–93° C.

To a solution of 6 parts of 1-[β-(2-thenoyl)ethyl]-4-(4-methyl-2-pyridyl)piperazine in 120 parts of absolute ethanol, is added 0.7 part of sodium borohydride portionwise at 30° C. The stirring is continued for 2 hours at 30°. The mixture then is cooled to 20° C. and is decomposed with 40% 2-N hydrochloric acid, diluted with 600 parts of water and made alkaline with sodium hydroxide. After chilling for 8 hours at 0° C., the precipitate formed is collected and recrystallized from diisopropyl ether at −20° C. to yield the white shiny micro-crystals of 1-(2-thienyl) - 3 - [4 - (4 - methyl - 2 - pyridyl)piperazine]-propanol melting at about 94.6–96° C. The compound has the formula

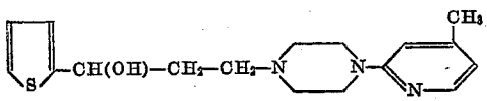

*Example 4*

A mixture of 6.2 parts of 2-(γ-chlorobutyryl)thiophene and 9.9 parts of 1-(2-pyrimidyl)piperazine is heated at 105° C. for 5 hours and cooled. The mixture is then treated with water and ether. The ether layer is separated, dried over sodium sulfate, filtered and petroleum ether added to the filtrate. After chilling to −20° C., the precipitate is collected and dried to yield 1-[γ-(2-thenoyl)propyl]-4-(2-pyrimidyl)piperazine. The yellow powder of this compound melts at about 57.5–58.6° C.

To a solution of 3 parts of 1-[γ-(2-thenoyl)propyl]-4-(2-pyrimidyl)piperazine in 80 parts of absolute ethanol, is added 0.3 part of sodium borohydride portionwise at 25° C. The stirring is continued for 150 minutes at 20° C., after which the mixture is decomposed by the portionwise addition of 90 parts of 2-N hydrochloric acid. The mixture is cooled to 15° C., made alkaline with 20% sodium hydroxide, diluted to a total volume of 1,000 parts and further cooled at −15° C. for one hour. The precipitate which forms is filtered, recrystallized from diisopropyl ether by chilling at 0° C., and dried to yield the white amorphous powder of 1-(2-thienyl)-4-[4-(2-pyrimidyl)piperazine]butanol melting at about 97.6–99.4° C. The compound has the formula

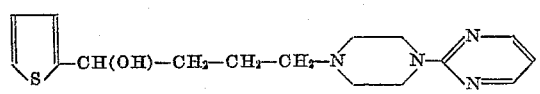

What is claimed is:
1. A compound of the structural formula

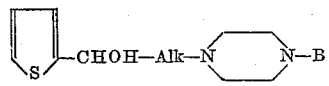

wherein B is a member of the class consisting of pyridyl, pyrimidyl, and methylpyridyl and Alk is a lower alkylene radical.

2. A compound of the formula

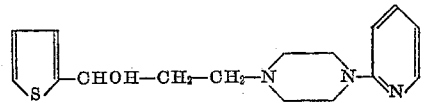

3. A compound of the formula

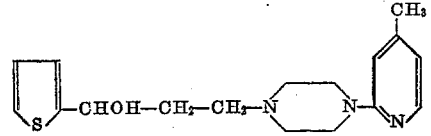

4. 1-(2-thienyl)-4-[4-(2-pyridyl)piperazine]-1-butanol.
5. 1 - (2 - thienyl) - 4 - [4 - (2 - pyrimidyl)piperazine]-1-butanol.

No references cited.

UNITED STATES PATENT OFFICE
CERTIFICATION OF CORRECTION

Patent No. 2,973,360            February 28, 1961

Paul A. J. Janssen

It is hereby certified that error appears in the above numbered patent requiring correction and that the said Letters Patent should read as corrected below.

Column 1, line 39, for "(Alkali metal)NH$_4$" read -- (Alkali metal)ZH$_4$ --; same column 1, lines 58 to 61, the formula should appear as shown below instead of as in the patent:

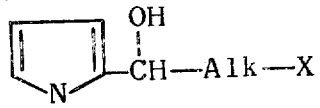

Signed and sealed this 5th day of September 1961.

(SEAL)
Attest:

ERNEST W. SWIDER            DAVID L. LADD
Attesting Officer            Commissioner of Patents